(12) United States Patent
Al-Garni et al.

(10) Patent No.: US 9,327,207 B2
(45) Date of Patent: May 3, 2016

(54) SPHERICAL DESALINATION DEVICE

(71) Applicant: KING FAHD UNIVERSITY OF PETROLEUM AND MINERALS, Dhahran (SA)

(72) Inventors: Ahmed Z. Al-Garni, Dhahran (SA); Mohammed Aves, Hyderabad (IN)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 312 days.

(21) Appl. No.: 13/932,924

(22) Filed: Jul. 1, 2013

(65) Prior Publication Data

US 2015/0001745 A1    Jan. 1, 2015

(51) Int. Cl.
  *B01D 3/32* (2006.01)
  *B01D 1/22* (2006.01)
  *C02F 1/04* (2006.01)
  *C02F 1/08* (2006.01)

(52) U.S. Cl.
  CPC ... *B01D 1/22* (2013.01); *C02F 1/04* (2013.01); *C02F 1/08* (2013.01)

(58) Field of Classification Search
  CPC ............ B01D 1/22; B01D 3/24; B01D 3/324; B01D 3/30; C02F 1/04; C02F 1/08
  USPC ................ 261/108–114.3, 127–157
  See application file for complete search history.

(56) References Cited

U.S. PATENT DOCUMENTS

| | | | | |
|---|---|---|---|---|
| 2,081,013 A | * | 5/1937 | Morse | ............. 261/117 |
| 4,270,981 A | | 6/1981 | Stark | |
| 4,546,798 A | * | 10/1985 | Porta | ............. 138/149 |
| 6,821,395 B1 | | 11/2004 | Ward | |
| 7,494,572 B2 | | 2/2009 | Tonkin et al. | |
| 8,083,902 B2 | | 12/2011 | Al-Garni et al. | |
| 8,341,961 B2 | | 1/2013 | Glynn | |
| 2002/0166294 A1 | * | 11/2002 | Rogers | ............ 52/81.1 |
| 2010/0230830 A1 | * | 9/2010 | Farsad et al. | ............ 261/20 |
| 2010/0314238 A1 | | 12/2010 | Frolov et al. | |
| 2011/0056822 A1 | * | 3/2011 | Elsharqawy et al. | ........... 203/11 |
| 2011/0139599 A1 | * | 6/2011 | Al-Garni | ............ B01D 1/0035 202/173 |
| 2012/0285629 A1 | | 11/2012 | Simpson et al. | |

OTHER PUBLICATIONS

Mattheus Goosen et al., Water Desalination Using Geothermal Energy, Energies, Energies, Jun. 22, 2010.*
S. S. Sablani et al., Simulation of Fresh Water Production Using a Humidification-Dehumidification Seawater Greenhouse, 159 Desalination 283, Jan. 31, 2003.*

* cited by examiner

*Primary Examiner* — Thomas Bennett McKenzie
(74) *Attorney, Agent, or Firm* — Richard C. Litman

(57) ABSTRACT

The spherical desalination device includes a hollow spherical transparent shell serving as a distillation chamber or still. Water initially flows through an underground system for geothermal heating, then flows into the hollow shell. The water flows from the upper portion of the shell, filling a series of concentric circular trays arranged in a conical stack within the shell. Water cascades from the smallest diameter uppermost tray to the largest lowermost tray, in sequence. Sunlight focused on the transparent shell causes the water to evaporate, and condensation collects upon the interior surface of the shell. A resilient seal extends about the lower rim of the largest and lowest evaporator tray, and is located at the equator of the hollow shell. The shell is rotated by an external motor, thereby drawing the internal surface of the shell across the seal to remove collected condensation from the internal surface of the shell.

6 Claims, 3 Drawing Sheets

SPHERICAL DESALINATION DEVICE

BACKGROUND OF THE INVENTION

1. Field of the Invention

The present invention relates generally to desalination devices and systems, and particularly to a spherical desalination device having a number of concentric circular evaporation trays arranged in a conical tiered stack. The evaporation trays are installed within a spherical glass shell that rotates to wipe condensation from the inner surface of the shell.

2. Description of the Related Art

Innumerable systems and devices have been developed in the past for the purpose of distilling and purifying various liquids. One environmental area in which this is particularly important is the arid areas of the Middle East, in which much of the potable water provided for the citizenry is produced from the evaporation of seawater.

All such distillation systems and devices require energy input for their operation. In many cases solar energy is used exclusively, but the use of only solar energy generally results in relatively inefficient production of pure water. Alternatively, many systems have been constructed to use energy input from other sources, e.g., heating by burning petroleum fuels, electrical energy produced by the burning of such fuels or other fossil fuels, etc. Such energy intensive systems are generally capable of producing a considerably greater volume of pure water than systems utilizing only solar energy, but the cost of water production is relatively high due to the cost of the energy used.

Thus, a spherical desalination device solving the aforementioned problems is desired.

SUMMARY OF THE INVENTION

The spherical desalination device includes a hollow spherical transparent shell that serves as a water distillation chamber or still. Water is initially warmed by passing through an underground system for geothermal heating, with the water then being pumped into the hollow spherical shell. The water flows from the upper portion of the shell, to fill a series of concentric circular trays arranged in a conical stack within the shell. Water flows from the smallest diameter tray at the top into the next smallest tray immediately below, and thence cascades into each successively lower and larger diameter tray until all the trays are filled. Sunlight focused on the transparent shell or still causes the water to evaporate, with the water collecting upon the interior surface of the shell.

A resilient seal is disposed about the lower rim of the largest and lowest evaporator tray, with this seal being placed at the equator of the hollow shell. The shell is rotated by an external motor, thereby drawing the internal surface of the shell across the seal to remove collected condensation from the internal surface of the shell. Evaporation is aided by reducing the air pressure within the shell. Internal and external fans may also be installed to cool the surface of the shell in order to promote condensation on the interior surface of the shell. The collected purified water is drained from the spherical shell to a collector tank.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The spherical desalination device comprises a hollow transparent spherical shell, undistilled water being pumped into the shell and evaporating therein. The evaporated, distilled water is then recovered from the shell for use.

Figure 1:
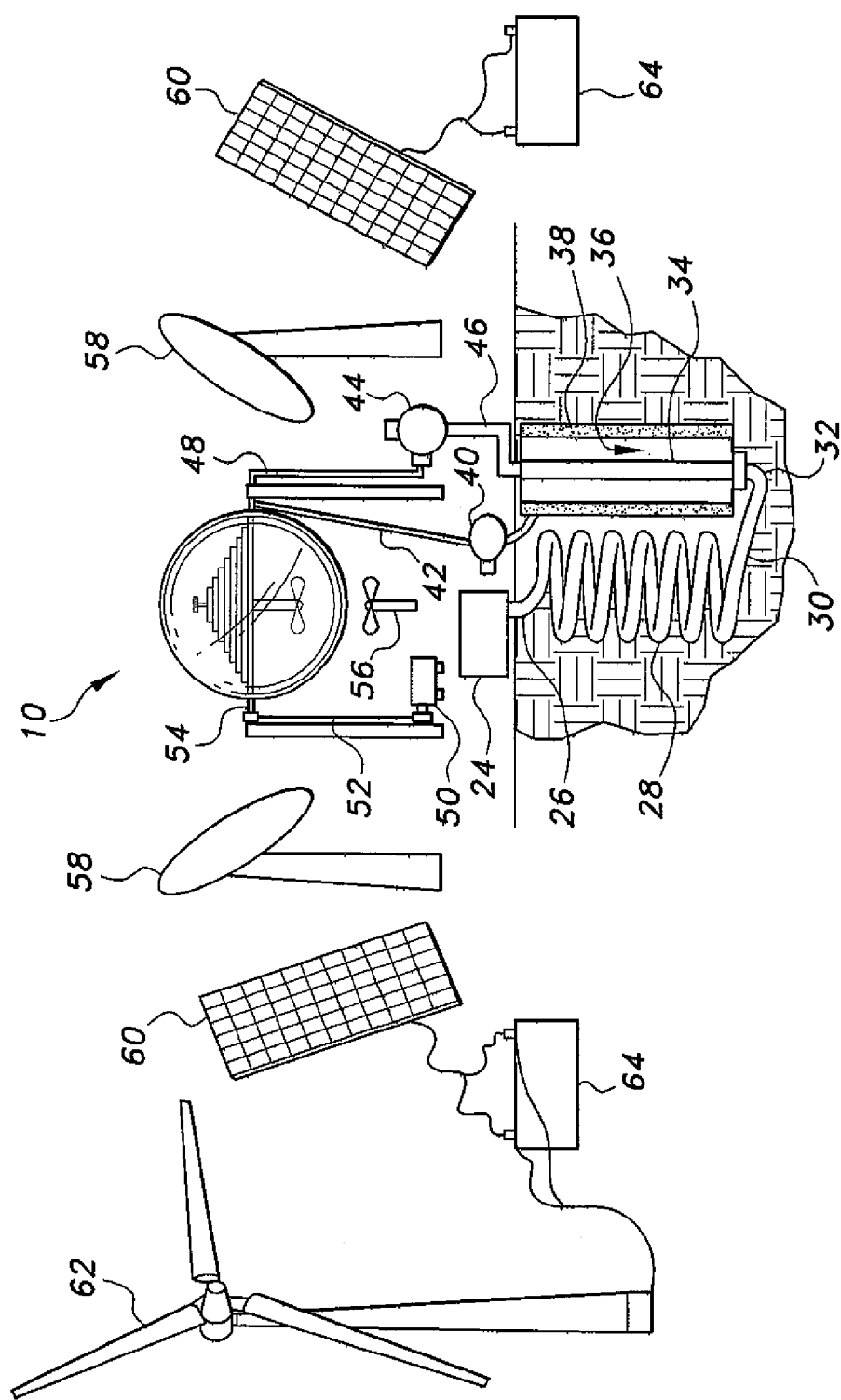
FIG. 1 is a diagrammatic perspective view of a spherical desalination device according to the present invention, illustrating its various components and their relationships.

FIG. 1 provides a schematic diagram showing the basic components of the device or system. The primary component is the hollow transparent spherical shell 10 that serves as the distilling component or still. The shell 10 may be made of glass or other suitable transparent material to allow sunlight or other heat energy to pass through the wall of the shell to heat the contents therein.

Figure 2:
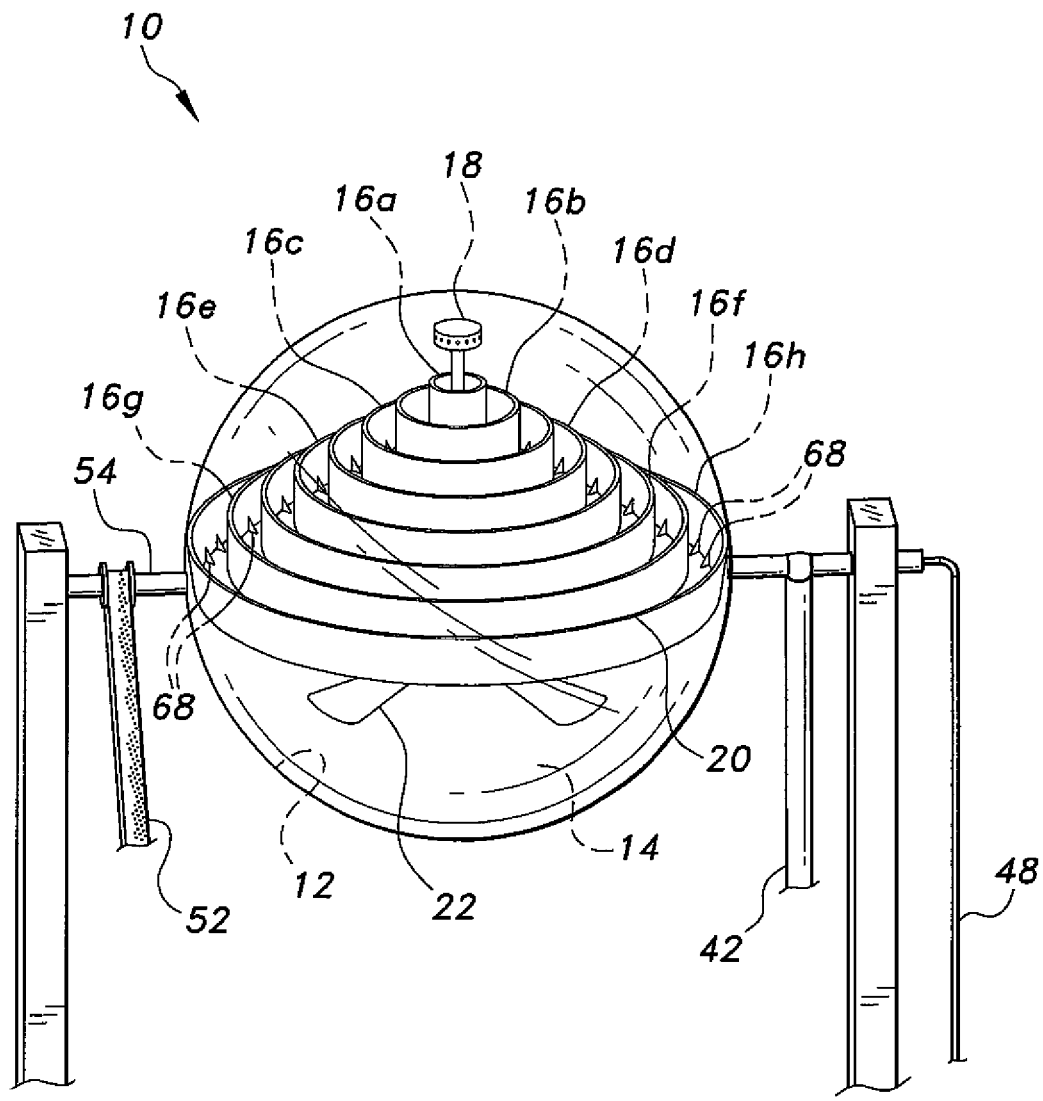
FIG. 2 is a perspective view of the spherical evaporation shell of the spherical desalination device of FIG. 1, showing its internal conical array of evaporator trays, supports, belt drive, and vacuum and water lines and connections.

FIG. 2 provides a more detailed view of the shell 10. The shell includes an internal surface 12 and defines an internal volume 14. A plurality of circular evaporator trays, e.g., 16a through 16g, is installed within the spherical shell 10. The trays range from the smallest diameter uppermost tray 16a to the largest diameter lowermost tray 16g, with a largest, lowermost collector tray 16h at the bottom. The trays are arranged in a concentric tiered conical stack, as shown in FIGS. 1 and 2. A water dispenser 18 (nozzle, spray head, etc.) extends concentrically through the stack of trays 16a through 16h, with water flowing primarily into the uppermost tray 16a and cascading into each successive tray therebelow. A resilient seal 20 is installed along the rim of the largest diameter, lowermost collector tray 16h, with this seal 20 bearing against the internal surface 12 of the shell 10 essentially at the horizontal equator thereof. A circulation fan 22 is installed within the internal volume 14 of the shell 10 beneath the trays 16a through 16h. This fan 22 serves to circulate air within the lower hemisphere of the shell 10, to draw air heated by the glass of the shell 10 away from the internal surface 12 thereof and simultaneously warm the bottom of the trays 16a through 16h. Much of the air within the shell 10 is evacuated, but some air remains and the internal circulation fan 22 serves to circulate this air.

FIG. 1 illustrates the componentry of the system external to the transparent spherical shell 10. Undistilled water is provided from a water supply in a storage tank 24 or the like. However, rather than transferring the water directly to the shell 10, the water first passes through a geothermal water heating system to warm the water initially before the water flows into the hollow shell 10. The undistilled water initially flows into the inlet end 26 of a subterranean water heating coil 28, with the water being heated by the latent heat of the earth. The heating coil 28 is passive, in that it does not receive any other energy input.

The heated water flows from the output end 30 of the coil 28, into the input end 32 of a return line 34 that returns the heated water to the surface. The return line 34 is enclosed in a thermally insulated vacuum chamber 36 disposed below the surface, with the chamber insulation 38 serving to reduce heat loss as the heated water flows upward closer to the cooler surface of the earth. A vacuum pump 40 draws air from the vacuum chamber 36, and is also connected to the hollow shell 10 via a vacuum line 42 to draw air from the interior 14 thereof. A water pump 44 draws the heated water from the output end 46 of the return line 34, and delivers that initially heated water to the distilling shell 10 via a water inlet line 48.

Distilled water condenses on the internal surface 12 of the shell 10 during operation of the system or device. Eventually this condensation will run down the inner surface 12 of the shell 10 to be collected in the outermost tray 16h. However, more rapid collection of the condensation is achieved by rotating the hollow spherical shell 10 about a horizontal axis, around the relatively stationary trays 16a through 16h. This rotation is accomplished by means of a motor 50 disposed externally to the shell 10, with the motor 50 driving the rotation of the shell 10 by a belt 52 or other alternative mechanism, e.g., chain drive, geared shaft, etc. The tiered trays 16a through 16h remain horizontal within the shell 10 by means of any conventional mechanism, e.g., stationary connecting shaft concentric with the rotary drive shaft 54, counterweights, etc. Similarly, the connections of the vacuum line 42 and water line 48 to the shell 10 may be by any conventional means, e.g., concentric tubes and sealed slip fittings, etc. Such fittings are well known in the pneumatic and hydraulic fields for transferring fluids under pressure from relatively moving or rotating components without loss. The circumferential seal 20 about the lowermost collector tray 16h wipes the condensation from the internal surface 12 of the shell 10 as the shell rotates around the evaporation and collector trays 16a through 16h, with the collected water running into the lowermost collector tray 16h for removal from the shell 10 by conventional means (e.g., drain pump and drain line through the rotary shaft 54, etc.).

Additional components are provided to assist in the evaporative process, as shown in FIG. 1. An external cooling fan 56 is installed beneath the shell 10, with the fan 65 directing airflow toward the bottom of the shell 10 to cool the shell in order to promote condensation on the shell. Conversely, one or more mirrors 58 may be provided to focus sunlight into the shell 10 or at least into the upper portion thereof, to promote heating of the evaporator trays 16a through 16g and corresponding evaporation of the water therein.

Electrical power for the operation of the various electrical components, i.e., the internal and external fans 22 and 56, the vacuum and water pumps 40 and 46, and the rotary drive motor 50 for the shell 10, may be provided by various so-called "clean" energy sources, e.g., solar power cells 60 and/or a wind turbine or generator 62, etc. The electrical power produced may be stored in storage batteries 64 for use in powering the above-described electrical components. The specific wiring diagram is not shown in order to simplify the drawing Fig., but such wiring is conventional and need not be illustrated.

Figure 3:
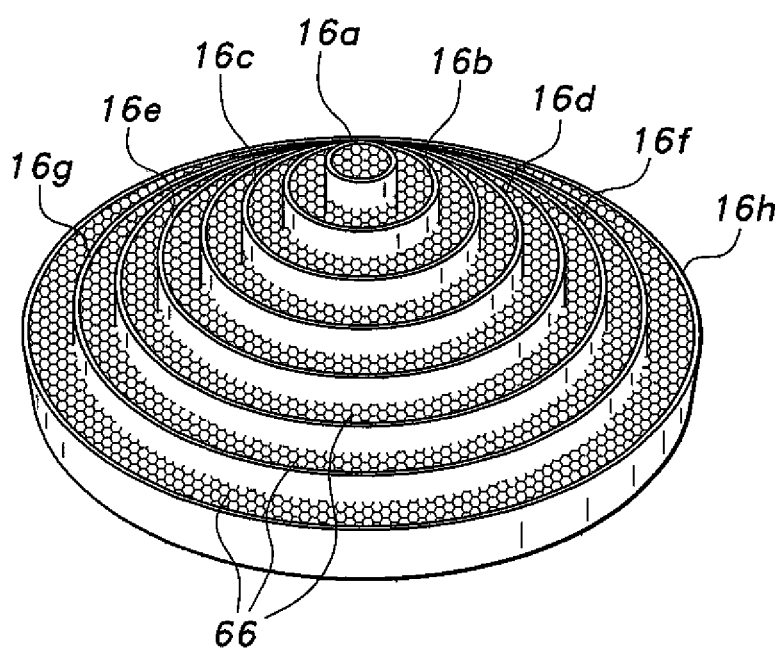
FIG. 3 is a perspective view of an alternative embodiment of an evaporator tray array for the spherical desalination device of FIG. 1, the array having honeycomb elements installed therein to provide greater surface area.

FIG. 3 provides a detailed perspective view of an alternative embodiment of the evaporator and collector trays 16a through 16h. The trays 16a through 16h of FIG. 3 contain honeycomb inserts 66 therein, within the concentric channels defined by each of the trays. The cells of the honeycomb inserts 66 are oriented vertically, to allow water to flow into the cells and to evaporate from the cells. The additional surface area provided by the honeycomb structure serves to enhance evaporation. Alternatively, a series of fins or vanes 68 may be installed within the trays 16a through 16h to increase the surface area and enhance evaporation, as shown in the tray array of FIG. 2, with the fins or vanes 68 and honeycomb inserts 66 not normally being installed in the same array of trays. The trays 16a through 16h may be formed of any suitable material, but are preferably constructed of a phase change material (PCM) of four layers or plies, with two inner plies adapted to absorb heat, a medial ply that generates heat upon reaching a predetermined trigger temperature, and an outer ply that serves as a thermal insulator. Latent heat is stored in the PCM when it reaches the trigger temperature, with this heat being released into the water in the trays as the apparatus cools at night or in cloudy conditions. Such phase change material is well known in other fields, and is conventional.

It is to be understood that the present invention is not limited to the embodiments described above, but encompasses any and all embodiments within the scope of the following claims.

We claim:

1. A spherical desalination device, comprising:
a hollow, spherical transparent shell defining an internal volume and having an internal surface;
a plurality of evaporator trays disposed within the shell, the trays ranging from an uppermost tray to a lowermost tray;
a subterranean geothermal water heating system communicating with the internal volume of the shell, the geothermal water heating system being adapted for receiving water to be desalinated;
a motor disposed external to the shell, the motor selectively rotating the shell about a horizontal axis, the shell rotating about the evaporator trays; and
a resilient seal disposed about the circumference of the lowermost tray, the seal bearing against the internal surface of the shell and wiping condensation from the internal surface of the shell as the shell rotates.

2. The spherical desalination device according to claim 1, wherein:
the evaporator trays are assembled in a concentric, tiered conical stack, ranging from an uppermost smallest diameter tray to a lowermost largest diameter tray; and
a vacuum pump is disposed external to the shell, the vacuum pump communicating with the internal volume of the shell.

3. The spherical desalination device according to claim 1, further comprising a circulation fan disposed beneath the evaporator trays within the internal volume of the shell.

4. The spherical desalination device according to claim 1, further comprising a cooling fan disposed beneath the shell, the cooling fan directing airflow toward the shell.

5. The spherical desalination device according to claim 1, wherein the geothermal water heating system further comprises:
a storage tank adapted for holding the water to be desalinated;
a passive, subterranean water heating coil having an input end and an output end, the input end communicating with the storage tank;
a return line having an input end and an output end, the input end of the return line communicating with the output end of the heating coil;
a thermally insulated subterranean vacuum chamber surrounding the return line;
a vacuum pump drawing air from the vacuum chamber; and
a water pump communicating with the output end of the return line and the shell, the water pump transferring water from the return line to the shell.

6. The spherical desalination device according to claim 1, further comprising a honeycomb insert disposed within each of the evaporator trays.

* * * * *